March 25, 1941.　　　A. I. KIRKLAND　　　2,236,101
TORQUE LIMITING CHUCK
Filed May 31, 1940　　　3 Sheets-Sheet 2

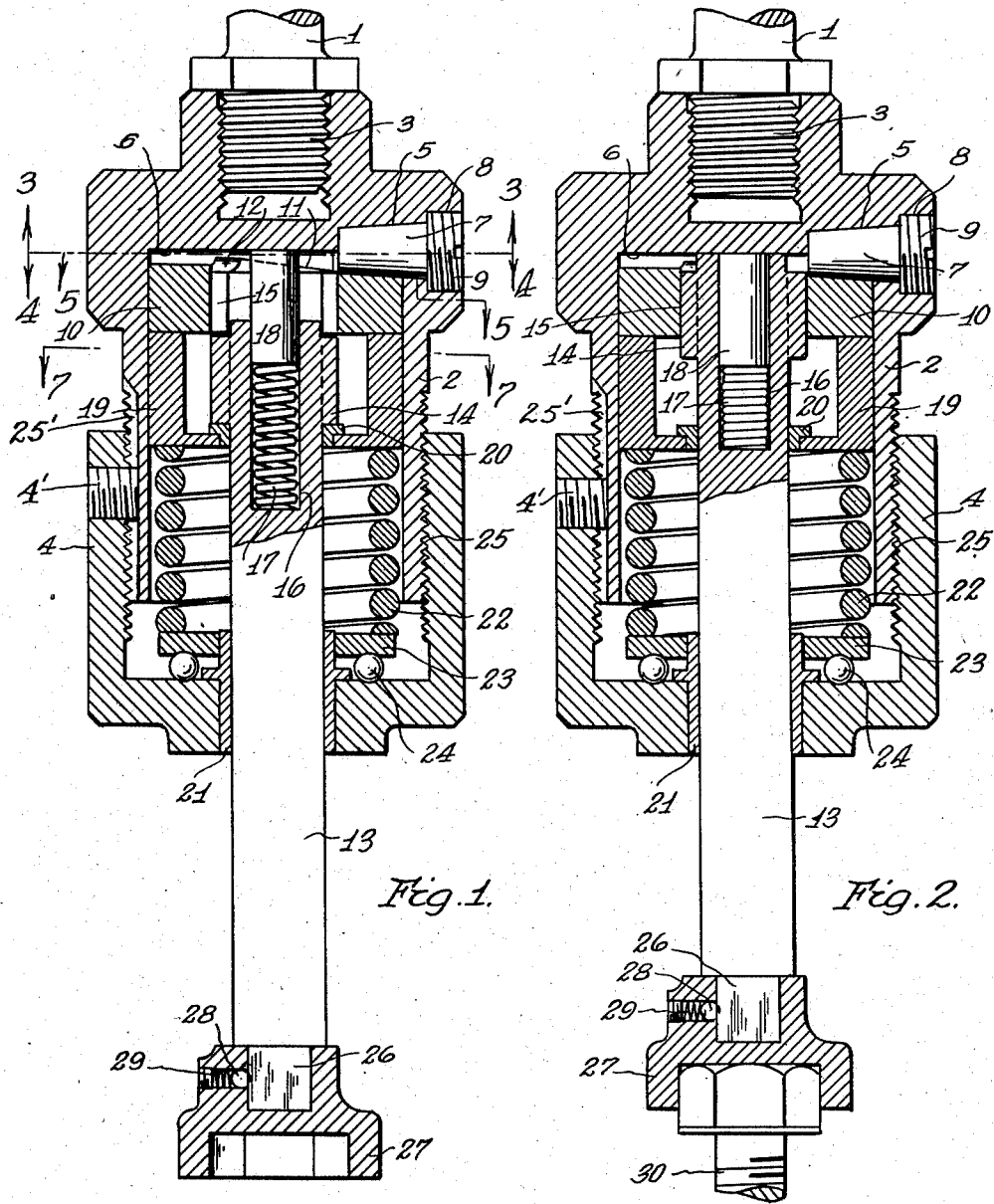

INVENTOR.
Arthur I. Kirkland
BY Samuel Weisman
ATTORNEY.

March 25, 1941.                A. I. KIRKLAND                2,236,101
                          TORQUE LIMITING CHUCK
                    Filed May 31, 1940          3 Sheets-Sheet 3

INVENTOR.
Arthur I. Kirkland
BY Samuel Wiseman
ATTORNEY.

Patented Mar. 25, 1941

2,236,101

UNITED STATES PATENT OFFICE 2,236,101

TORQUE LIMITING CHUCK

Arthur I. Kirkland, Detroit, Mich., assignor to Detroit Power Screwdriver Company, a corporation of Michigan Application May 31, 1940, Serial No. 337,971

7 Claims. (Cl. 192—30.5)

The present invention pertains to a novel chuck through which motion is transmitted from a power shaft to a driven or work shaft for the purpose of enabling the latter shaft to perform any sort of work for which it may be adapted such as, for example, driving a stud into a body.

A chuck of this general character is disclosed in my United States Patent No. 2,069,527 of February 2, 1937. The broader objects stated in the patent are applicable to the present invention, but a more precise object of this invention is to provide a chuck having means for limiting the torque applied to the work, whereupon the chuck automatically becomes inoperative when a predetermined torque is reached.

The device of the invention comprises essentially a housing in which are mounted a driven clutch element and driving members cooperating with abutments on the element. The driven element has a driving connection with the work shaft and is yieldingly held against the driving members by means of a spring. The tension of the spring against the clutch element is regulated by means of an adjustable part of the housing. A power shaft drives the housing, the driving members, the clutch element and the work shaft. When the torque of the work shaft exceeds the pressure of the spring, the latter yields to permit the driving members to ride over the abutments without imparting motion to the work shaft.

Another object of the invention is to provide a chuck wherein the driving connection between the work shaft and the clutch element is automatically disengaged when the work shaft is withdrawn from the work, so that the work shaft is not rotated when the device is idle. Accordingly, the driving connection is a slidable one, and the work shaft is under the pressure of a spring tending to break the connection. The connection is made, against the action of this spring, only when the work is engaged by the work shaft and the housing pushed towards the work. This connection may be in the nature of a spline or a tongue and socket between the work shaft and the driven clutch element.

The invention is fully disclosed by way of example in the following description and in the accompanying drawings in which:

Figure 1 is a vertical section of the device in release or idle position;

Figure 2 is a similar section of the device in engaged or operative position;

Reference to these views will now be made by use of like characters which are employed to designate corresponding parts throughout.

Figure 3:
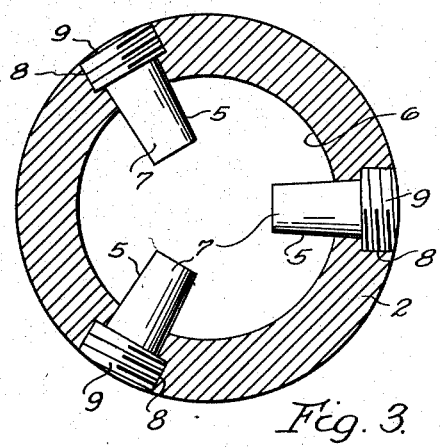
Figure 3 is a section on the line 3—3 of Figure 1.
Figure 4:
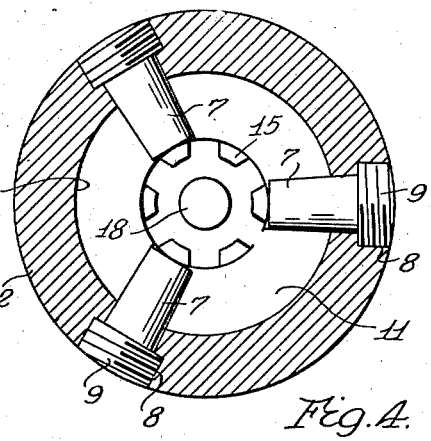
Figure 4 is a section on the line 4—4 of Figure 1.
Figure 5:
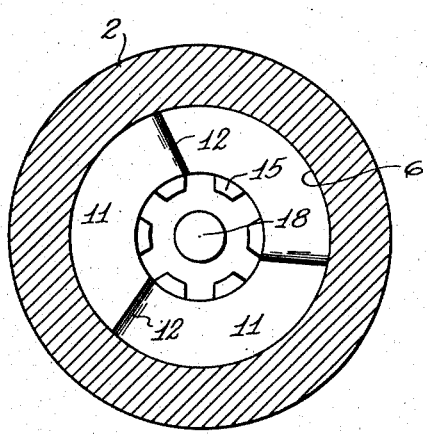
Figure 5 is a section on the line 5—5 of Figure 1.
Figure 7:
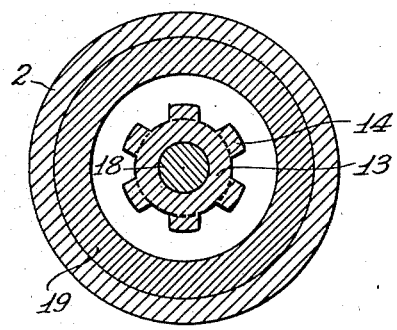
Figure 7 is a section on the line 7—7 of Figure 1.

In Figures 1 and 2 is shown the lower end of a driving spindle 1 to which is attached a substantially cylindrical housing 2 by any suitable means such as screw threads 3. It will be understood that the power for rotating the spindle 1 may be applied by any well known or suitable means. On the lower end of the housing 2 is adjustably screwed an inverted cap 4. Other parts, presently to be described, are inserted before the cap is applied, and it will become evident that the assembly is maintained by means of the cap.

In the top of the member 3 are formed a number of radial grooves 5 exposed to the cavity 6 of the member 2. The grooves receive rollers 7 which are preferably but not necessarily tapered. The rollers may for convenience be inserted through openings 8 in the side wall of the member 3 and subsequently closed by screw plugs 9.

Figure 6:
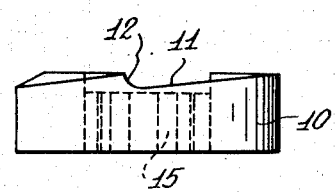
Figure 6 is a side elevation of the driven clutch disk.
Figure 8:
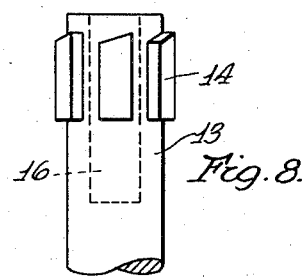
Figure 8 is an elevation of the driven shaft showing the external spline formed on the upper end thereof.

Assuming that the cap 4 has not yet been applied, a driven clutch disk 10 is inserted through the open end of the housing 1 and moved into contact with the rollers 7. The upper surface of this member, as shown more clearly in Figure 6, is formed with a plurality of slopes or inclines 11 extending circumferentially and corresponding in number and in spacing to the rollers 7. The lower end of each slope merges into a stop seat or abutment 12 which determines the upper end of the next slope. The rollers 7 are adapted to engage the abutments 12 and drive the clutch disk 10 on rotation of the spindle 1 and housing 2 therewith, and the rotation of the clutch disk is transmitted to other parts by the mechanism that will presently be described.

The driven or work shaft 13 which is next inserted has its upper end formed with an external spline 14 adapted to engage an internal spline 15 formed concentrically in the clutch disk 10. In the upper end of the shaft 13 is formed a cavity 16 receiving a coil spring 17 on which is mounted a pin 18. The latter engages the top of the cavity 16 in the housing 2 and serves as an abutment whereby the spring 17 disengages the spline connection when there is no downward pressure on the housing 2 or no upward pressure on the shaft 13, as shown in Figure 1. This is the idle position of the device.

A follower 19 in the shape of a cup is next inserted in the housing 2 and brought against the bottom of the clutch disk 10. In the bottom of the member 19 is fitted a bushing 20 forming a bearing for the shaft 13 and a stop limiting the downward movement of the spline 14 when the latter is withdrawn from spline 15 by the spring 17, as in Figure 1. The bottom of the cap 4 is also fitted with a bronze bushing 21 for the shaft 13. A heavy coil spring 22 is next inserted, followed by a base plate 23, and finally the cap 4 is screwed on, with ball bearings 24 inserted between its bottom and the plate 23. The tension of the spring 22 against the follower 19 is obviously determined by the position of the cap on the threads 25 of the housing 2.

The outer or lower end of the shaft 13 may be formed for direct attachment to the work or may be fitted with an adapter for this purpose. For example, the shaft may be squared at 26 at its lower end to receive a socket member 27 held by a ball 28 backed by a spring 29 mounted in the member. The member 27 fits on the head of a stud 30 to be driven into a body or may, in like manner, engage a nut or any other piece of work for which it is adapted.

In the subsequent operation, the device, including the drive shaft 1 and housing 2—4, is pushed toward the work until the upper wall of the cavity 6 engages the upper end of the shaft 13 as shown in Figure 2. This movement also engages the splines 14 and 15 with each other and forms a driving connection between the clutch disk 10 and the shaft 13. At the same time the spring 17 is obviously compressed by the inward movement of the pin 18. The rotation of the shaft 1 and housing 2 brings the rollers 7 against the abutments 12 of the clutch disk 10 to drive the disk and the shaft 13.

When the work piece 30 has been driven home, the spring 22 will yield if it has previously been adjusted to the proper tension, and the rollers 7 on striking the abutments 12 will press the clutch disk 10 and ride over the abutments. In so doing the rollers also descend on the slopes 11. It will be seen that the latter are of substantial extent circumferentially, or considerably longer than the diameter of the rollers. Consequently, the rollers descend gradually in approaching the next abutment and thereby eliminate the abrupt drop which is characteristic of other tools and which impart an axial pounding which strains the threads and tires the operator. The first few impacts of the rollers against the abutments at this time will tighten the member 30, and subsequently the rollers will ride more freely over the abutments. Since this action depends on the tension of the spring 22 as stated above, it is evident that the initial adjustment of the spring determines the maximum torque to be applied to the work piece 30, and the spring 22 is of course adjusted accordingly by means of the cap 4. The adjustment is secured by a stud 4' threaded in the cap and receivable in any one of a number of grooves 25' cut at suitable intervals across the threads 25.

The riding of the rollers over the abutments can be felt by the operator and is a signal to him that the tool should be withdrawn from the work piece. When this is done, the spring 17 expands and disengages the splines 14, 15 with the result that the continued rotation of the shaft 1 and housing 2 under power is not transmitted to the work shaft 13 when the latter is idle.

Figures 9 to 13 show a modified device operating on substantially the same principle but designed to run with somewhat less bumping when the work piece has been driven home.

As in the other construction, there is a power shaft 31 to which is attached a cylindrical housing 32 by any suitable means such as screw threads 33. The top of the cavity 34 is formed with radial grooves 35 in which are mounted rollers 36. The driven clutch member is in the form of an elongated body 37 formed with a head 38 at its upper end. Beneath the head is a ring 39 adapted to slide on the narrower part of the body 37 under conditions presently to be described.

Figure 9:
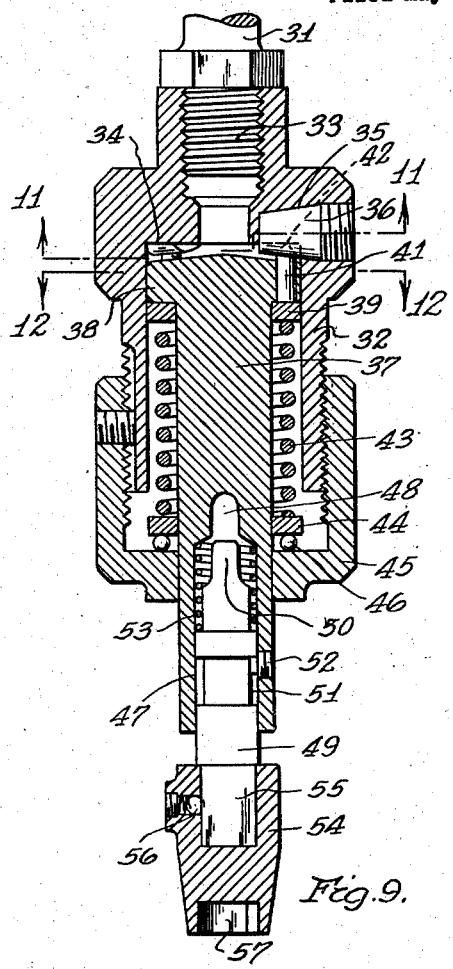
Figure 9 is a vertical section of a modification, illustrating the release or idle position.
Figure 10:
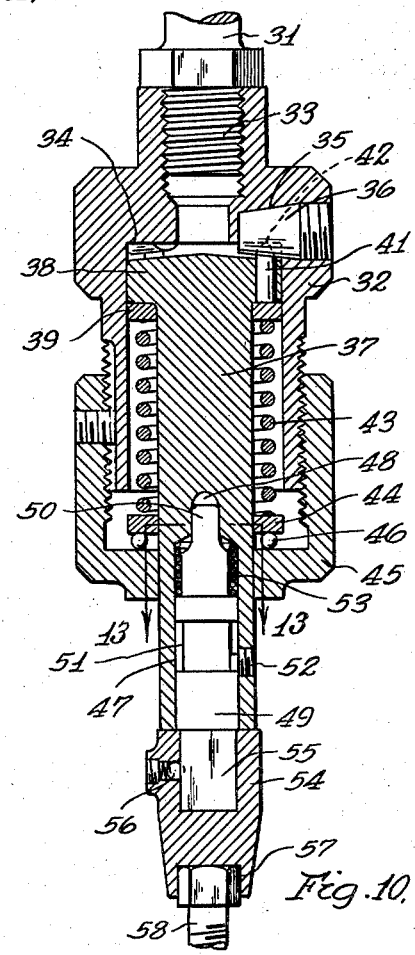
Figure 10 is a similar section showing the engaged or operative position.
Figure 11:
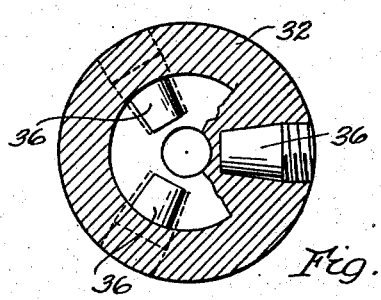
Figure 11 is a section on the line 11—11 of Figure 9.
Figure 12:
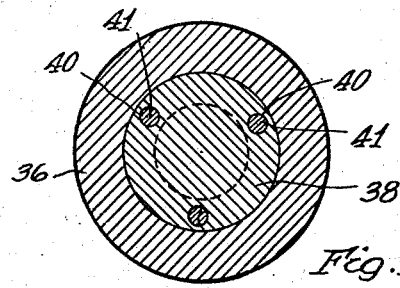
Figure 12 is a section on the line 12—12 of Figure 9.
Figure 13:
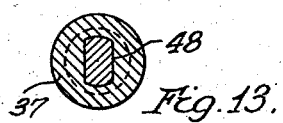
Figure 13 is a section on the line 13—13 of Figure 10.

A number of holes 40 are formed through the overhanging part of the head and correspond in number and in spacing to the rollers 36. In each hole is slidably mounted a pin 41 having its upper end pointed as at 42 and normally exposed above the top of the head as shown in Figures 9 and 10 for engagement by one of the rollers 36.

The ring 39 is backed by a rather heavy coil spring 43 resting on a base plate or ring 44. With this assembly completed, a cap 45 is screwed on the open end of the housing 32, with ball bearings 46 inserted between the ring 44 and the bottom of the cap.

The elongated member 37 extends through the bottom of the cap 45 and a considerable distance beyond the same. A cavity 47 is drilled into the body from the outer or forward end thereof and terminates in a non-circular socket 48 as shown more clearly in Figure 12. Into the cavity is inserted a driven or work shaft 49 formed at its upper end with a tongue or key 50 adapted to enter the socket 48 for a driving engagement with the clutch member 37. A lengthwise groove 51 is formed in the member 49 and receives a pin 52 fixed in the member 37. Consequently the shaft 49 may be released from the socket 48, but not entirely ejected from the cavity 47, by a coil spring 53 surrounding the reduced upper portion of the shaft and bearing against the end wall of the cavity 47.

The exposed end of the shaft 49 may engage the work directly or may be adapted for this purpose, for example, by means of a socket member 54 mounted on the squared tip 55 of the shaft and held thereon by a spring-pressed ball 56. The socket 57 in the member 54 may engage the head of a stud 58 or a nut or other member for which it is adapted.

In the idle condition of the device, the spring 53 disengages the tongue 50 from the socket 48, as in Figure 9. When the work is engaged, the shaft 31 and the housing 32—45 are moved towards the work so that the spring 53 is compressed and the tongue 50 received in the socket 48, as in Figure 10. On rotation of the shaft, the rollers 36 engage the pointed ends of the pins 41 and drive the clutch member 37 and with it the work shaft 49. When the work has been driven home and a predetermined torque is set up in the member 37, the spring 43 yields to permit the roller to depress and ride over the pins 41, in the manner described in connection with Figures 1 to 7. The initial overriding, however, exerts some lateral force against the pins to tighten the work piece. The overriding can be felt by the operator, whereupon he withdraws the tool from the work. The spring 53 then disengages the shaft 49 from the socket 48 so that this shaft is not driven while the tool is idle with the shaft 31 rotating under power.

Although specific embodiments of the invention have been illustrated and described, it will be understood that various alterations in the details of construction may be made without departing from the scope of the invention as indicated by the appended claims.

What I claim is:

1. A chuck comprising a rotary housing, a driven clutch member therein and having abutments, driving members propelled by said housing and adapted to engage said abutments, a work shaft having a sliding connection with said clutch member in driving relation therewith, and a spring bearing against said housing and supporting said clutch member in driving relation with said driving members, said spring being disposed between said clutch member and the working end of said shaft, whereby said driving members override said abutments and shift said member on said driving connection to compress said spring, when the torque developed in said shaft exceeds the tension of said spring.

2. A chuck comprising a rotary housing, a driven clutch member therein and having abutments, driving members propelled by said housing and adapted to engage said abutments, a work shaft having a sliding connection with said clutch member in driving relation therewith, spring means tending to eject said shaft out of said housing and to withdraw the shaft from driving engagement with said clutch member, and a spring bearing against said housing and supporting said clutch member in driving relation with said driving members, said spring being disposed between said clutch member and the working end of said shaft, whereby said driving members override said abutments and shift said member on said driving connection to compress said spring, when the torque developed in said shaft exceeds the tension of said spring.

3. A chuck comprising a rotary housing, a driven clutch member therein and having abutments, driving members propelled by said housing and adapted to engage said abutments, a work shaft having a direct sliding connection with said clutch member in driving relation therewith, and a spring bearing against said housing and supporting said clutch member in driving relation with said driving members, said spring being disposed between said clutch member and the working end of said shaft, whereby said driving members override said abutments and shift said member on said driving connection to compress said spring, when the torque developed in said shaft exceeds the tension of said spring.

4. A chuck comprising a rotary housing, a driven clutch member therein and having abutments, driving members propelled by said housing and adapted to engage said abutments, a work shaft having a fully releasable sliding connection with said clutch member in driving relation therewith, and a spring bearing against said housing and supporting said clutch member in driving relation with said driving members, said spring being disposed between said clutch member and the working end of said shaft, whereby said driving members override said abutments and shift said member on said driving connection to compress said spring, when the torque developed in said shaft exceeds the tension of said spring.

5. A chuck comprising a rotary housing, a driven clutch member therein and having abutments, driving members propelled by said housing and adapted to engage said abutments, a work shaft having a direct sliding connection with said clutch member in driving relation therewith, spring means pending to eject said shaft out of said housing and to withdraw the shaft from driving engagement with said clutch member, and a spring bearing against said housing and supporting said clutch member in driving relation with said driving members, said spring being disposed between said clutch member and the working end of said shaft, whereby said driving members override said abutments and shift said member on said driving connection to compress said spring, when the torque developed in said shaft exceeds the tension of said spring.

6. A chuck comprising a rotary housing, a driven clutch member therein and having abutments, radial driving rollers mounted between said housing and clutch member and adapted to engage said abutments, each abutment having a slope extending therefrom in the driving direction, said slopes being engageable by said rollers and having each a length substantially greater than the diameter of said rollers, a work shaft having an axial spline engagement with said clutch member, and a spring mounted in said housing and holding said clutch member against said rollers, whereby said rollers override said abutments and travel on said slopes when the torque developed in said shaft exceeds the tension of said spring.

7. A chuck comprising a rotary housing, a driven clutch member therein and having abutments, radial driving rollers propelled by said housing and adapted to engage said abutments, each abutment having a slope extending therefrom in the driving direction, said slopes being engageable by said rollers and having each a length substantially greater than the diameter of said rollers, a work shaft having a sliding connection with said clutch member in driving relation therewith, and a spring bearing against said housing and supporting said clutch member in driving relation with said rollers, said spring being disposed between said clutch member and the working end of said shaft, whereby said rollers override said abutments and travel on said slopes, thereby shifting said member on said sliding connection to compress said spring, when the torque developed in said shaft exceeds the tension of said spring.

ARTHUR I. KIRKLAND.